April 30, 1946. C. B. GREGORY 2,399,435
FISHING POLE HOLDER
Filed Aug. 28, 1944
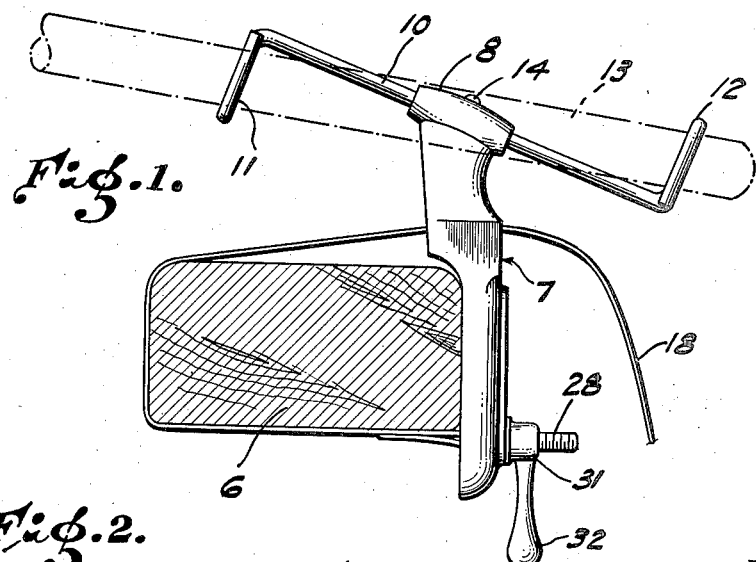
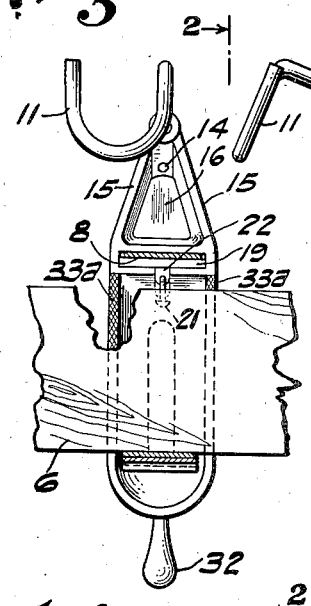
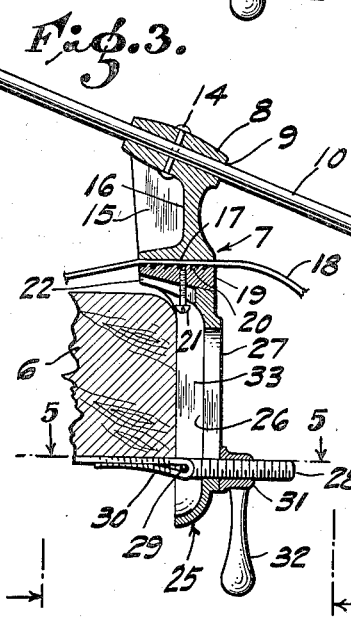
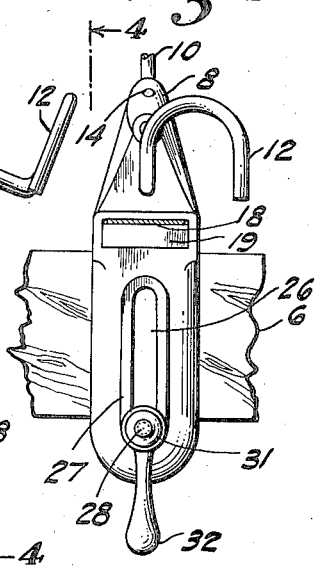
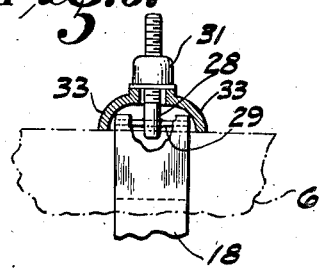
CHARLES B. GREGORY,
INVENTOR.
BY
ATTORNEY.

Patented Apr. 30, 1946

2,399,435

UNITED STATES PATENT OFFICE 2,399,435

FISHING POLE HOLDER

Charles B. Gregory, Los Angeles, Calif.

Application August 28, 1944, Serial No. 551,483

8 Claims. (Cl. 248—42)

This invention relates to a fishing pole holder.

In fishing, whether as a sport or for profit, it not infrequently occurs that the fisherman desires to leave his baited hook in the lake, stream or ocean where he is fishing, during intervals while he is attending to other matters. This invention supplies the need for a simple and readily mountable fishing pole support for the above indicated purpose.

Among the objects of the invention are: to provide, for cooperating with a pole-holding member, an improved, adjustable clamp structure which is applicable to handrails and the like varying greatly in size and shape; to provide a clamp structure for use in the above stated situation which will utilize to advantage a flexible connection, such as a leather or fabricated strap, to loop around the handrail or the like to which the device is attached; and to provide an improved take up means for a flexible connection looped around a handrail or the like, such as is commonly provided along the sides of piers and boats for safety purposes.

Other objects, advantages and features of invention will hereinafter appear.

Referring to the accompanying drawing, which illustrates what is at present deemed to be a preferred embodiment of the invention, Fig. 1 is a side elevation of the device showing the same attached to a handrail, the latter being sectioned, the end portion of the fishing pole being outlined in broken lines.

Fig. 2 is an end elevation of the device in the mounted position of Fig. 1, with parts in section, the view point of the observer being indicated by the broken line 2—2 of Fig. 3.

Fig. 3 is a vertical midsection of the mounted device, except that some parts are shown in elevation.

Fig. 4 is an elevation looking at the device from the line 4—4 of Fig. 3, the strap or band being sectioned.

Fig. 5 is a fragmentary, transverse section on line 5—5 of Fig. 3.

Referring in detail to the drawing, where the device is shown applied to a railing 6, the body 7 forms the upper part of the clamp frame and has its upper portion 8 constructed as a standard having through it an inclined bore 9 to receive the fishing-pole-holder 10, the latter consisting of a rigid rod which after insertion is bent at one end to provide a downwardly directed loop 11 and at its opposite end bent into an upwardly directed loop 12, the butt portion 13 of the fishing pole being insertable through said loops, to support the pole in the upwardly inclined operative position indicated in Fig. 1. An elongated rivet 14 is shown in Fig. 3, said rivet passing diametrically through the bore and holder 10 to hold the latter in its operative position.

The clamp portion 8 may be regarded as a head which is supported by a neck consisting of a web structure having side portions 15 united at their back edges by a cross-web 16. Subjacent to these webs the standard body 7 has through it an opening or tapered passage 17 which tapers from rear to front, the width or horizontal dimension of this opening being slightly greater than the width of the flexible connection or strap 18 shown extending through said opening.

A wedge shaped gripping jaw or key 19 having rearwardly directed saw-like teeth or ratchet toothed side portion 20 to grip the strap 18 is shown occupying said passage 17. This key has through it a vertical bore into which screws a set screw 21, which is abuttable against the lower side of the strap 18 and which prevents complete disconnection of the tapered or wedge-shaped key 19 from the passage 17 provided for it. A slot 22, cut from the front into the clamp body 7 below the passage 17, admits the screw 21 and provides for a front to rear adjustment of the key 19 by which it is carried.

Below the clamp body 7 the device is furnished with a downward extension 25 having through its midwidth portion a vertical slot 26 bordered rearwardly with a reinforcing rib 27. Through this slot passes the strap take-up T-bolt 28 the head 29 of which passes through a loop 30 in the attached end portion of strap 18. Onto said bolt screws a nut 31 having an operating handle 32. That side portion of the clamp frame which is designed for abuttal against the railing 6 is bordered at each side and below by an arcuate flange 33, thus providing a clearance between the slotted portion of the applied clamp and the adjacent side of the railing, which clearance facilitates adjustment of the set screw 21 and also affords more room for tractive movement of the head 29 of the T-bolt 28. That part of the flange portion 33 which grips its railing 6 is knurled or serrated at 33a.

Before the device is put into use the tapered key 19 will be inserted into the wide end of the passage 17 and the set screw 17 will then be put into place, said screw acting as a stop pin to prevent withdrawal of the key. Also the looped end portion 30 of the connection 18 will be connected with the vertically slotted portion of the clamp frame by means of the bolt 28 and nut 31 will be applied to said bolt as shown in Figs. 1, 3 and 4 after said bolt has been projected through the slot which it occupies.

In placing the device in its operative position the clamp frame (consisting of the parts 7 and 25), is abutted against one side of the railing 6. The operator will next feed the free end of the connection 18 from left to right (Fig. 3) through the passage 17 above the key 19, and will then draw forcibly upon the fed through portion of said connection, at the same time pressing in upon the key 19 to cause the latter to grip the connection. The connection, thus applied, will closely embrace the railing but will not be tensioned sufficiently to keep the clamp frame securely in applied position. However, by now screwing down the handled nut 31, the desired forcible gripping of the railing by the connection will be secured to keep the entire device in a stable, applied position.

It should be understood that the present disclosure is for the purpose of illustration only and that this invention includes all modifications and equivalents which fall within the scope of the subject matter claimed.

What is claimed is:

1. In a device of the kind described, a body having an upper end portion constructed to support a fishing pole, said body having a downwardly directed extension with a vertical slot through it, a screw-threaded member adjustable along said slot and having its end portions at opposite sides of the slot in all its adjusted positions, a flexible connection for looping around a support, said body having a tapered passage through it subjacent to its aforesaid upper end portion through which said connection extends, take-up means in said passage for said connection, said take-up means comprising a wedge-shaped member abuttable against said connection to withstand traction thereupon, one end of said connection being secured to the aforesaid screw-threaded member, and a clamping nut on said screwthreaded member in an abutting relation to the aforesaid slotted part of said body to apply traction to said strap in opposition to said take-up means.

2. In a device of the kind described, a body having through it a tapered passage, means carried by said body above said passage to support a fishing pole, a strap-like flexible connection for looping around a support, a portion of said connection occupying said passage, a wedge-shaped key fitted into said passage in contact with said strap, a set screw carried by said key, said set screw having an end portion abuttable against said strap, said set screw constituting the movable part of stop means which limits the movement of said key toward the widened end of said passage, said body having a downward extension, and traction means for said connection carried by said extension and connected with an end of said strap, the action of said traction means upon said strap causing the latter to wedge said key more tightly into said tapered passage.

3. In a device of the kind described, a clamp frame attachable to railings and the like, said frame being abuttable against such railing, a flexible connection for passing around the railing so that one portion of said connection extends along one side of the railing and another part thereof along the opposite side of the railing, means for attaching one of said portions of said connection to said clamp frame at one side of the railing, take-up means for the other of said portions of said connection, said take-up means comprising a tapered key located in a tapered passage through said clamp frame, said connection extending through said passage and being gripped between said key and a side portion of the passage, said key being so positioned that force tending to withdraw the clamp from the railing will through said connection wedge the key more tightly into the tapered passage which it occupies, said clamp frame having a wall portion underlying said tapered passage and provided with a slot which extends lengthwise of the passage, and a stop pin carried by said key and projecting into said slot to travel therealong, said pin being abuttable against an end of said slot to prevent withdrawal of the key from said passage.

4. In a device of the kind described, a body having through it a tapered passage, means carried by said body above said passage to support a fishing pole, a strap-like flexible connection for looping around a support, a portion of said connection occupying said passage, a wedge-shaped key fitted into said passage in contact with said strap, said body having a downward extension, and traction means for said connection carried by said extension and connected with an end of said strap, the action of said traction means upon said strap causing the latter to wedge said key more tightly into said tapered passage.

5. In a device of the kind described, a clamp frame attachable to railings and the like, said frame being abuttable against such railing, a flexible connection for passing around the railing so that one portion of said connection extends along one side of the railing and another part thereof along the opposite side of the railing, means for attaching one of said portions of said connection to said clamp frame at one side of the railing, and take-up means for the other of said portions of said connection, said take-up means comprising a tapered key located in a tapered passage through said clamp frame, said connection extending through said passage and being gripped between said key and a side portion of the passage, said key being so positioned that force tending to withdraw the clamp from the railing will through said connection wedge the key more tightly into the tapered passage which it occupies.

6. In a device of the kind described, a body having an upper end portion constructed to support a fishing pole, said body having a downwardly directed extension with a vertical slot through it, a screwthreaded member adjustable along said slot and having its end portions at opposite sides of the slot in all its adjusted positions, a flexible connection for looping around a support, one end of said connection being secured to an end of said screwthreaded member and another portion of said connection being attachable to said body above said vertical slot, and a clamping nut on said screwthreaded member in an abutting relation to the slotted part of said body and operable to apply traction to said flexible connection.

7. The subject matter of claim 6, and take-up means for said flexible connection carried by said body above its said slotted portion.

8. In a device of the kind described, a body having through it a tapered passage, a strap-like flexible connection for looping around a support, a portion of said connection occupying said passage, a wedge-shaped key fitted into said passage in contact with said strap, said body having a downward extension, and traction means for said connection carried by said extension and connected with an end of said strap, the action of said traction means upon said strap causing the latter to wedge said key more tightly into said tapered passage.

CHARLES B. GREGORY.